March 18, 1924.

G. KAWASAKI

BUMPER

Filed Oct. 5, 1923    2 Sheets-Sheet 1

1,487,105

Witnesses:

Inventor:
Goro Kawasaki
By Joshua R. H. Potts
his Attorney.

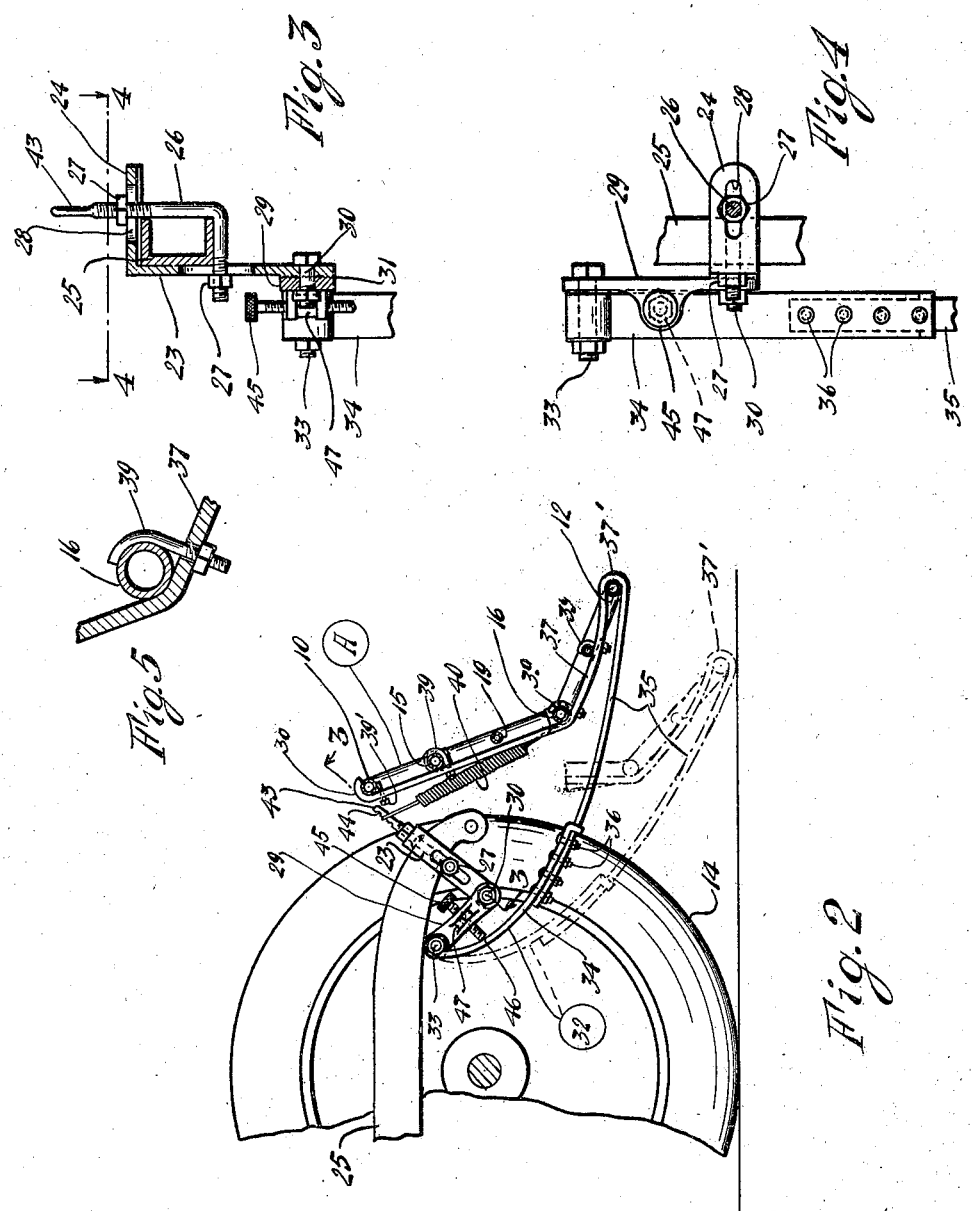

Patented Mar. 18, 1924.

1,487,105

UNITED STATES PATENT OFFICE.

GORO KAWASAKI, OF CHICAGO, ILLINOIS.

BUMPER.

Application filed October 5, 1923. Serial No. 666,809.

*To all whom it may concern:*

Be it known that I, GORO KAWASAKI, a subject of the Emperor of Japan, and a resident of the city of Chicago, county of Cook, and State of Illinois, have invented certain new and useful Improvements in Bumpers, of which the following is a specification.

My invention relates to new and useful improvements in bumpers for vehicles and has for its principal object the provision of an improved construction of this character, which will be highly efficient in use and economical in manufacture.

Among the salient objects of the invention is the provision of a device of this character which is capable upon meeting with resistance to obstruct passage under the vehicle with which the device is associated while at the same time guarding the adjacent parts of the vehicle against damage due to such resistance. In the preferred construction, to be hereinafter described, it is my object to incorporate certain combination of elements and parts, as a part of the device, which will be durable to support the bumper in its normal or initial position, and at the same time have the properties of resiliency permitting movement of the bumper upon meeting with resistance.

In carrying out the objects of the invention it is aimed to construct the device in a manner such that the same will be light in structure without lessening its esthetic value, and it is one of the objects of the invention to provide a device of this character which will operate automatically upon meeting with resistance and which will operate automatically to return to its initial position after the removal of such resistance.

Other objects will appear hereinafter.

The invention consists in the combinations and arrangements of parts hereinafter described and claimed.

The invention will be best understood by reference to the accompanying drawings forming a part of this specification, and in which—

Fig. 2 is a sectional view taken substantially on line 2—2 of Fig. 1;

Fig. 3 is a sectional view taken substantially on line 3—3 of Fig. 2;

Fig. 4 is a sectional view taken substantially on line 4—4 of Fig. 3, and

Fig. 5 is a fragmentary sectional view taken substantially on line 5—5 of Fig. 1.

Figure 1:
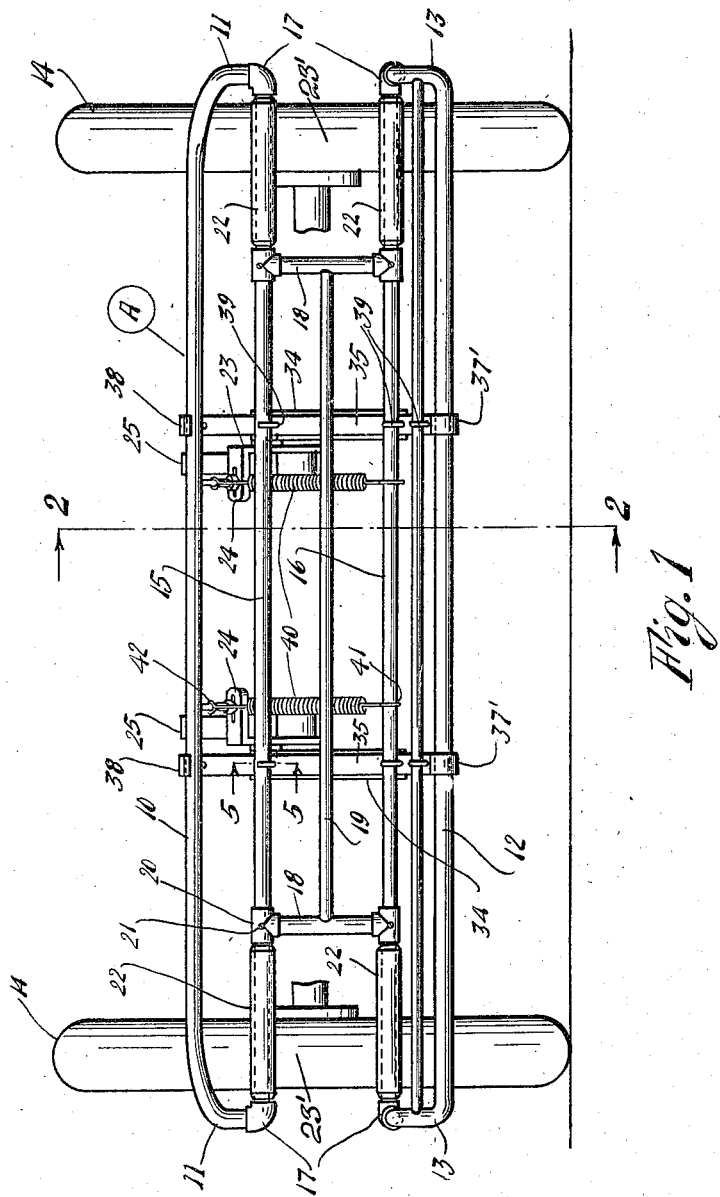
Fig. 1 is a front elevational view of a bumper embodying the invention.

In attaining the objects of the invention and referring to the drawings showing the preferred form of construction, the bumper is indicated at A and comprises a top frame member 10 having curved end portions 11 and a bottom frame member 12 also having curved end portions 13, the curved end portions 11 and 13 being preferably located beyond the outer side vertical plane of the front wheels 14 of the vehicle. The bumper further includes frame members 15 and 16 having opposite ends joined to the top and bottom frame members by elbows 17, the frame members 15 and 16 being joined together by transversely arranged bars 18 in turn joined together by a frame member 19, the bars 18 being preferably located an appreciable distance from the curved end portions of the frame members 10 and 11 and joined to the frame members 15 and 16 by T members 20 fixed to said frame members in rigid position by set screws 21. Between the elbows 17 and the T members 20 I prefer to mount rollers 22 which are adapted under certain conditions when the bumper is operative upon meeting with resistance to engage the peripheral edge of the tread 23' of the tire. This arrangement lessens the friction of the bumper upon such engagement with the tire tread and prevents damage to the tire due to friction between the tire tread and the bumper when a great amount of resistance is made by the bumper.

As shown in Fig. 2 the portion of the bumper frame work above the frame member 16 is inclined upwardly and rearwardly whereas the remaining portion of the bumper frame work below the frame member 16 is inclined downwardly and forwardly; the arrangement being such that when the bumper is moved down to the position illustrated in dotted lines in this figure the bumper frame work above the frame 16 will practically be in a vertical plane whereas the remaining portion of the bumper frame work will be inclined forwardly lessening the friction of the bumper when in contact with the ground.

The preferred form of bumper as herein described and as illustrated, shows the same to be made up of hollow frame members for the sake of durability and lightness, however, if desired for any reason, the bumper can be made of solid frame members such as metal bars or the like.

Means is provided for supporting the bumper A on the vehicle for movement. This means as shown in the drawings, preferably includes supporting brackets 23 having portions 24 for resting engagement on the chassis 25, said brackets being fixed in rigid position to the chassis by L-shaped bolts 26 threaded at their extremities to receive nuts 27 and passing through elongated openings 28 as shown. The brackets 23 are connected to toggle links 29 by suitable bolts 30, the adjacent contacting surfaces of the bracket and ends of the toggle joints being roughened as at 31 to provide gripping surfaces. The toggle links are in connection with spring arms 32, said connection being facilitated by bolts 33. The spring arms 32 comprise parts 34 and 35 adjustably connected together by bolts 36. The parts 35 of the spring arms have end portions 37 which pass around the frame member 12 as at 37' to the rear of the bumper and rearwardly inclined upwardly with the extremities 38 slightly curved to partly embrace the frame member 10, as best shown in Fig. 2, said portions 37 being fixed in rigid position to the bumper A by J-shaped clip bolts 39, with the curved portions of the bolts embracing the adjacent frame members to prevent displacement of the portions 37.

The bumper A is supported in normal or in its initial position by spring members 40 having lower end portions fixed to the frame member 16 as at 41 and upper end portions with loops 42 adapted to be received by the extremities 43 of the L-shaped bolts 26, said extremities 43 of said bolts being provided with spaced notches 44 permitting adjustment of the spring members 40.

As shown in Fig. 2, I provide means whereby the frame member 12 can be adjusted relatively with respect to the ground, this means in the present and preferred structure includes threaded bolts 45 taken through the toggle links 29 with their ends 46 in contact with the parts 34, the bolts 45 being provided with lock nuts 47. By this arrangement, by manipulating the bolts 45 the spring arms are caused to buckle and vary the distance between the frame member 12 and the ground.

In operation when the device as herein disclosed comes into contact with an object resisting the movement of the vehicle the bumper, by reason of its manner of attachment to the chassis of a vehicle, will be moved automatically rearwardly and downwardly with the frame member 12 in contact or close proximity with the ground, thereby obstructing passage under the vehicle. After the resistance has been removed the bumper will automatically resume its former position as best shown in Fig. 2, this return of the bumper to its initial position being accomplished through the medium of the springs 40 and spring arms 32. If the resistance is great and the bumper is moved rearwardly more than usual, under such conditions the rollers 22 are brought into contact with the front wheels of the vehicle for reasons herein stated.

It is intended that in the preferred construction that the resiliency of the spring arms and of the springs 40 be such that the bumper be permitted to move under resistance of a slight nature such as might be met with upon the bumper coming into contact with the body.

From the description herein it is apparent that I provide a bumper which accomplishes all the objects of the invention and which can be associated with vehicles of conventional types.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described, in combination with the chassis of a vehicle, of a bumper adapted to be attached to the chassis for downward movement under certain conditions, resilient means affording attachment of the bumper to the chassis, and flexible members having end portions connected to the bumper adapted to resist downward movement thereof.

2. A device of the class described, in combination with the chassis of a vehicle, a movable bumper adapted to be supported forwardly of the chassis, means affording attachment of the bumper to the chassis, and flexible members having operative connection to the bumper adapted to resist movement of the bumper in one direction.

3. A device of the class described, in combination with the chassis of a vehicle, a movable bumper adapted to be supported forwardly of the chassis, means affording attachment of the bumper to the chassis, and flexible members including parts adjustably connected together having operative connection to the bumper adapted to resist movement of the bumper in one direction.

4. A vehicle bumper including a frame, supporting members having means of attachment to a vehicle, resilient members having end portions attached to the supporting members and end portions attached to the frame, and resilient members having end portions attached to the supporting members and having portions inclined rearwardly and upwardly with the extremities curved to partly embrace the upper longitudinal frame member of the frame.

5. A vehicle bumper including a frame, supporting means having means of attachment to a vehicle, resilient members having end portions attached to the supporting means and end portions attached to the frame, and members having means of attachment to the supporting means and having inclined portions carrying the frame.

6. A vehicle bumper including a frame having means of attachment to a vehicle permitting automatic upward and downward movement of the frame, and resilient means controlling the movements of the frame and having portions extending over the lower longitudinal frame member of the frame with extremities curved to partly embrace the upper longitudinal frame member of the frame.

7. A vehicle bumper including a frame having means of attachment to a vehicle permitting automatic upward and downward movement of the frame, resilient means controlling the movements of the frame and having portions extending over the lower longitudinal frame member of the frame with extremities curved to partly embrace the upper longitudinal frame member of the frame, and means operative on the last named means for varying the distance between the ground and said lower longitudinal frame member.

8. A vehicle bumper including supporting members having means of attachment to a vehicle, link members adjustably carried by the supporting members, spring arms having end portions attached to the link members and having portions inclined rearwardly and upwardly with curved extremities, a frame having a frame member partly embraced by the curved extremities and supported by the resilient arms for automatic movement, and members having means of attachment to the supporting members and to the frame controlling the automatic movements of the frame.

9. A vehicle bumper including supporting members having means of attachment to a vehicle, link members adjustably carried by the supporting members, spring arms including parts adjustably connected together having end portions attached to the link members and having portions inclined rearwardly and upwardly with curved extremities, a frame having a frame member partly embraced by the resilient arms for automatic movement, and members having means of attachment to the supporting members and to the frame controlling the automatic movements of the frame.

10. A vehicle bumper including supporting members having means of attachment to a vehicle, link members adjustably carried by the supporting members, spring arms having end portions attached to the link members and having portions inclined rearwardly and upwardly with curved extremities, a frame having a frame member partly embraced by the curved extremities and supported by the resilient arms for automatic movement, members having means of attachment to the supporting members and to the frame controlling the automatic movements of the frame, and means carried by the link members and operative on the spring arms for varying the distance between the ground and the lower longitudinal frame member of the frame.

11. A vehicle bumper including supporting members having means of attachment to a vehicle, link members adjustably carried by the supporting members, spring arms including parts adjustably connected together having end portions attached to the link members and having portions inclined rearwardly and upwardly with curved extremities, a frame having a frame member partly embraced by the curved extremities and supported by the resilient arms for automatic movement, members having means of attachment to the supporting members and to the frame controlling the automatic movements of the frame and means carried by the link members and operative on the spring arms for varying the distance between the ground and the lower longitudinal frame member of the frame.

In testimony whereof I have signed my name to this specification in the presence of two subscribing witnesses.

GORO KAWASAKI.

Witnesses:
JOSHUA R. H. POTTS,
MARGARET AUER.